(12) United States Patent
Saito

(10) Patent No.: US 10,850,405 B2
(45) Date of Patent: Dec. 1, 2020

(54) ROBOT HAND

(71) Applicant: DENSO WAVE INCORPORATED, Chita-gun (JP)

(72) Inventor: Wataru Saito, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 180 days.

(21) Appl. No.: 15/633,230

(22) Filed: Jun. 26, 2017

(65) Prior Publication Data

US 2017/0368694 A1 Dec. 28, 2017

(30) Foreign Application Priority Data

Jun. 27, 2016 (JP) .................................. 2016-126747

(51) Int. Cl.
*B25J 15/08* (2006.01)
*B25J 11/00* (2006.01)
*B25J 15/02* (2006.01)
*B25J 19/00* (2006.01)
*B25J 15/10* (2006.01)
(Continued)

(52) U.S. Cl.
CPC ........... *B25J 15/08* (2013.01); *B25J 11/0045* (2013.01); *B25J 13/02* (2013.01); *B25J 15/026* (2013.01); *B25J 15/0253* (2013.01); *B25J 15/086* (2013.01); *B25J 15/10* (2013.01); *B25J 19/0075* (2013.01); *B25J 15/00* (2013.01); *G05B 2219/39* (2013.01)

(58) Field of Classification Search
CPC ............................... B25J 15/0253; B25J 15/10
See application file for complete search history.

(56) References Cited

U.S. PATENT DOCUMENTS

| 4,865,301 A | * | 9/1989 | Ise | ........................ | B23Q 7/043 269/34 |
| 6,234,487 B1 | * | 5/2001 | Shoemaker, Jr. | ......... | A63F 9/30 273/447 |

(Continued)

FOREIGN PATENT DOCUMENTS

| DE | 20 2006 009 792 U1 | 8/2006 | | |
| EP | 0208827 A1 | * | 1/1987 | .......... B25J 15/0273 |

(Continued)

OTHER PUBLICATIONS

"Hermetic_Seal.pdf" (Year: 2010).*

*Primary Examiner* — Michael S Lowe
(74) *Attorney, Agent, or Firm* — Oliff PLC

(57) ABSTRACT

A robot hand is designed to open or close fingers using a linear actuator disposed in a housing. The robot hand has linear motion shafts extending from inside to outside the housing through guide holes formed in a wall of the housing. Each of the fingers includes a base portion and a tip portion. The base portions are secured to the linear motion shafts outside the housing. The tip portions are bent inwardly from the base portions in directions in which they approach each other and then extend toward tips of the fingers. A sealing member is disposed between each of the linear motion shafts and a corresponding one of the guide holes to hermetically isolate the inside of the housing from the outside thereof. This structure achieves an increased degree of sealing of the housing and is capable of having an increased opening or closing stroke of the fingers.

11 Claims, 6 Drawing Sheets

(51) Int. Cl.
*B25J 13/02* (2006.01)
*B25J 15/00* (2006.01)

(56) References Cited

U.S. PATENT DOCUMENTS

| | | | | |
|---|---|---|---|---|
| 6,386,609 | B1* | 5/2002 | Govzman | B25J 15/0253 |
| | | | | 294/119.1 |
| D678,377 | S* | 3/2013 | Umeno | D15/199 |
| 8,684,432 | B2* | 4/2014 | Saka | B25J 15/08 |
| | | | | 294/119.1 |
| 2006/0263270 | A1* | 11/2006 | Rizzotte | G01N 35/0099 |
| | | | | 422/400 |
| 2009/0133508 | A1* | 5/2009 | Johansson | G01L 5/228 |
| | | | | 73/862.046 |
| 2010/0131100 | A1 | 5/2010 | Takano | |
| 2016/0184986 | A1* | 6/2016 | Procyshyn | B25J 9/0009 |
| | | | | 74/490.05 |

FOREIGN PATENT DOCUMENTS

| | | |
|---|---|---|
| JP | S62-041408 A | 2/1987 |
| JP | S63-168872 A | 7/1988 |
| JP | 2008-200759 A | 9/2008 |
| JP | 2016-082835 A | 5/2016 |

\* cited by examiner

ROBOT HAND

CROSS REFERENCE TO RELATED DOCUMENT

The present application claims the benefit of priority of Japanese Patent Application No. 2016-126747 filed on Jun. 27, 2016, the disclosure of which is incorporated herein by reference.

BACKGROUND

1 Technical Field

The invention relates generally to a robot hand designed to have better sealing of an internal structural object.

2 Background Art

In recent years, robots have been used to perform food-related, medicine-making, or medical operations. Robot hands used for such operations are desired not to emit harmful foreign objects, such as grease or abrasive powder, to working environments. The robot hands are also required to have a structure which resists the deposition of dust and which is easy to clean. It is, therefore, necessary to enhance the degree of sealing of internal structural parts of the robot hands.

Most robot hands are, as taught in Japanese Patent First Publication No. 2008-200759, equipped with two fingers which are closed to grip and then pick up an object or workpiece.

However, robots which are not designed for special tasks, such as food-related, medicine-making, or medical operations referred to in the above publication, need not to have a high degree of sealing of the internal structure thereof. The robot hand, as taught in the above publication, has internal mechanisms greatly exposed from a front wall of a housing outside the robot hand.

In a case where the robot hand is designed to have a restricted finger movement range, a high degree of sealing may be achieved by using an elastic member, such as silicone rubber, to cover movable parts. Such structures of robot hands are practically used, however, they have limited applications, so that they are not capable of holding a variety of objects which are different in size or shape from each other.

SUMMARY

It is, therefore, an object to provide a robot hand which is designed to have an enhanced degree of sealing of internal structure and enabled to have an increased opening or closing stroke of fingers.

According to one aspect of this disclosure, there is provided a robot hand which comprises: (a) a housing; (b) a first and a second guide hole which are formed in a wall of the housing; (c) a first linear motion shaft which extends from inside to outside the housing through the first guide hole; (d) a second linear motion shaft which extends from inside to outside the housing through the second guide hole; (e) a first finger which has a front portion and a base portion, the base portion being secured to the first linear motion shaft outside the housing; (f) a second finger which has a front portion and a base portion, the base portion being secured to the second linear motion shaft outside the housing; (g) a linear actuator which is disposed in the housing, the linear actuator working to linearly move the first and second linear motion shafts to open or close the front portions of the first and second fingers; and (h) sealing members which hermetically seal between the first guide hole and the first linear motion shaft and between the second guide hole and the second linear motion shaft.

Specifically, the linear actuator is disposed in the housing and works to linearly move the first and second fingers through the first and second linear motion shafts. The first and second fingers are joined at the base portions thereof to the first and second linear motion shafts. The first and second linear motion shafts extend laterally from inside to outside the housing through the first and second guide holes. The sealing members are fit in the first and second guide holes to hermetically isolate an inner chamber of the housing from the outside. This achieves a high degree of sealing of the first and second guide holes to hermetically isolate internal parts, such as the linear actuator, etc., disposed in the housing from outside the housing. This eliminates a risk that the robot hand emits harmful foreign objects to working environments and also realizes the structure of the robot hand in which dust is unlikely to be deposited and which is easy to clean.

In the preferred mode of this disclosure, the front portion of each of the first and second fingers includes an intermediate portion and a tip portion. The intermediate portions of the first and second fingers are bent from the base portions toward a center line passing through a center of a front face of the housing. The tip portions extend from the intermediate portions toward tips of the first and second fingers, respectively. This enables an object which is smaller in size than a width of the housing (i.e., the front face) to be held or gripped by the first and second fingers.

The housing also has a front wall. The first and second peripheral walls extend from the front wall away from the first and second fingers. In other words, the first and second linear motion shafts extend from inside to outside the first and second peripheral walls without passing through the front wall. This eliminates the need for sealing the front wall and thus achieves a simple sealing structure which hermetically seals gaps between the first guide hole and the first linear motion shaft and between the second guide hole and the second linear motion shaft.

According to another aspect of the disclosure, there is provided a robot hand which comprises: (a) a housing which has a first peripheral wall and a second peripheral wall which are opposed to each other in a linear finger movement direction; (b) a first and a second guide hole which are formed in the first and second peripheral walls of the housing, respectively; (c) a first linear motion shaft which has a length extending from inside to outside the housing through the first guide hole in the linear finger movement direction; (d) a second linear motion shaft which has a length extending from inside to outside the housing through the second guide hole in the linear finger movement direction; (e) a first finger which has a front portion and a base portion, the base portion being secured to the first linear motion shaft outside the housing; (f) a second finger which has a front portion and a base portion, the base portion being secured to the second linear motion shaft outside the housing; (g) a linear actuator which is disposed in the housing, the linear actuator working to linearly move the first and second linear motion shafts in a lengthwise direction of the first and second linear motion shafts to open or close the front portions of the first and second fingers in the linear finger movement direction; and (h) sealing members which hermetically seal between the first guide hole and the first linear motion shaft and between the second guide hole and the second linear motion shaft.

Specifically, the linear actuator is disposed in the housing and works to linearly move the first and second fingers through the first and second linear motion shafts. The first and second fingers are joined at the base portions thereof to the first and second linear motion shafts. The first and second linear motion shafts extend laterally from inside to outside the housing through the first and second guide holes. The sealing members are fit in the first and second guide holes to hermetically isolate an inner chamber of the housing from the outside. This achieves a high degree of sealing of the first and second guide holes to hermetically isolate internal parts, such as the linear actuator, etc., disposed in the housing from outside the housing. This eliminates a risk that the robot hand emits harmful foreign objects to working environments and also realizes the structure of the robot hand in which dust is unlikely to be deposited and which is easy to clean.

In the preferred mode of this disclosure, the front portion of each of the first and second fingers includes an intermediate portion to and a tip portion. The intermediate portions of the first and second fingers are bent from the base portions toward a center line passing through a center of a front face of the housing. The tip portions extend from the intermediate portions toward tips of the first and second fingers, respectively. This enables an object which is smaller in size than a width of the housing (i.e., the front face) to be held or gripped by the first and second fingers.

The housing also has a front wall. The first and second peripheral walls extend from the front wall away from the first and second fingers. In other words, the first and second linear motion shafts extend from inside to outside the first and second peripheral walls without passing through the front wall. This eliminates the need for sealing the front wall and thus achieves a simple sealing structure which hermetically seals gaps between the first guide hole and the first linear motion shaft and between the second guide hole and the second linear motion shaft.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings:

FIG. 3(*b*) is a front view which illustrates fingers of the robot hand of FIG. 1 when opened;

FIG. 4(*b*) is a front view which illustrates fingers of the robot hand of FIG. 1 when closed;

DESCRIPTION OF THE PREFERRED EMBODIMENT

Figure 1:
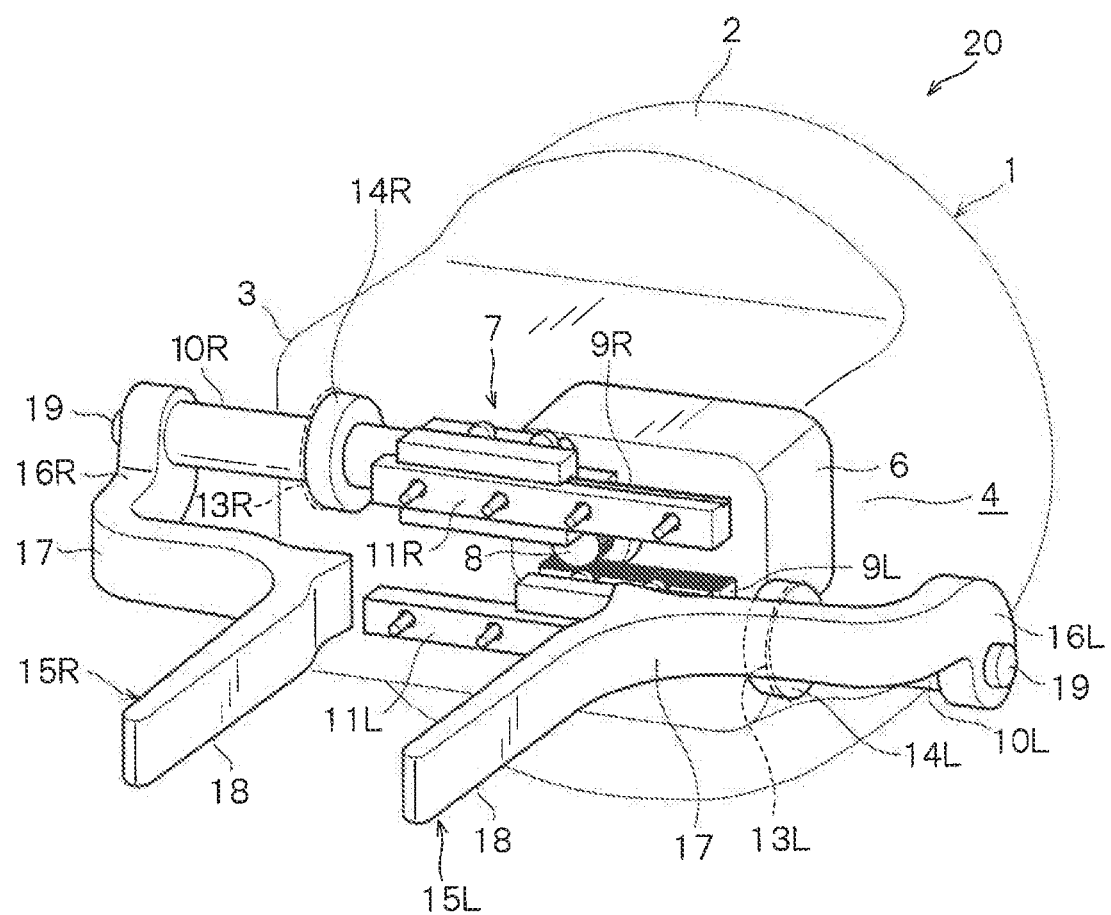
FIG. 1 is a perspective view which illustrates an internal structure of a housing of a robot hand according to an embodiment.
Figure 2:
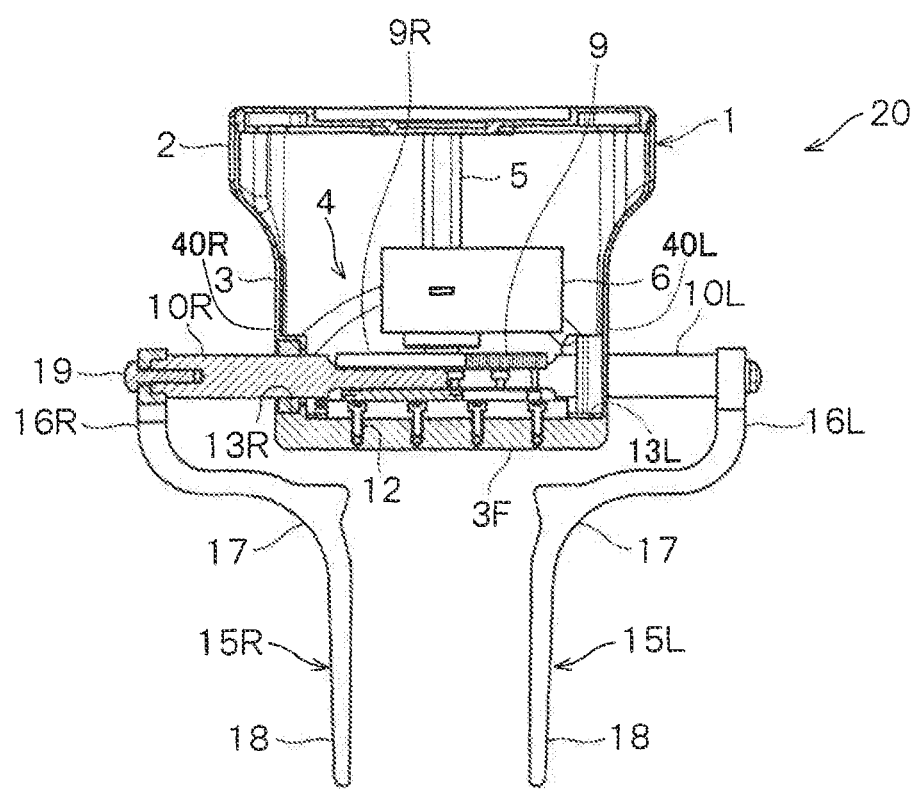
FIG. 2 is a longitudinal sectional view of the robot hand in FIG. 1.

The robot hand 20 according to an embodiment will be described below. FIG. 1 is a perspective view which illustrates an internal structure of the housing 1 of the robot hand 20. FIG. 2 is a longitudinal sectional view which illustrates the robot hand 20. The housing 1 is made up of the rear portion 2 and the front portion 3. The rear portion 2 is of a cylindrical shape and joined to an arm of a robot, not shown. The front portion 3 is substantially rectangular in section and frontward extends from the rear portion 2. The front portion 3 has the linear actuator 4 disposed therein. The linear actuator 4 is, as illustrated in FIG. 2, secured to the support member 5 and includes the speed reducer 6 with a built-in motor and the linear motion mechanism 7 joined to an output shaft of the speed reducer 6.

The linear motion mechanism 7 is equipped with the pinion 8, the racks 9R and 9L, the shafts 10R and 10L, and the guides 11R and 11L. In this disclosure, subscripts "R" and "L," represent parts for a right hand and a left hand of a human side, respectively. The pinion 8 is mounted on an output shaft of the speed reducer 6. The rack 9R is located above the pinion 8. The rack 9L is located beneath the pinion 8. The pinion 8 meshes with the racks 9R and 9L to constitute so-called rack-and-pinion mechanisms.

The shafts 10R and 10L are, as illustrated in FIG. 2, joined at rear end portions thereof to the racks 9R and 9L, respectively. The shafts 10R and 10L extend substantially parallel to each other. The guides 11R and 11L are secured to an inner surface of the front wall 3F of the front portion 3 through the fasteners 12, The guide 11R retains the rack 9R and the shaft 10R to work as the rack-and-pinion mechanism in which the rack 9R and the shaft 10R are linearly movable. Similarly, the guide 111, retains the rack 9L and the shaft 10L to work as the rack-and-pinion mechanism in which the rack 9L and the shaft 101, are linearly movable. The shafts 10R and 10L serve as linear motion shafts which linearly move in a lateral direction, as viewed in FIG. 2, in other words, a lengthwise direction of the shafts 10R and 10L or a direction in which the fingers 15R and 15L are opened or closed (which will also be referred to below as a linear finger movement direction).

The front portion 3 has, as clearly illustrated in FIG. 2, peripheral walls, i.e., right and left walls 40R and 40L opposed to each other in the direction in which the shafts 10R and 10L (i.e., the linear motion shafts) are linearly moved by the linear actuator 4. The right and left walls 40R and 40L substantially extend parallel to each other from the front wall 3F of the housing 1. In other words, the right and left walls 40R and 40L extend rearward from the front wall 3F of the housing 1 away from the fingers 15R and 15L and have formed therein the guide holes 13R and 13L, respectively, which are circular in shape. The guide holes 13R and 13L face each other in the lateral direction of the robot hand 20. The guide hole 13R has the center axis aligned with the length of the shaft 10R. Similarly, the guide hole 13L has the center axis aligned with the length of the shaft 10L. The shafts 10R and 10L have front portions (i.e., right and left portions, as viewed in FIG. 2) which pass through the guide holes 13R and 13L and extend outside the right and left walls 40R and 40L of the housing 1, respectively. The sealing members 14R and 14L, such as oil seals, are disposed in annular gaps between the guide hole 13R and the shaft 10R and between the guide hole 13L and the shaft 10L, respectively, to hermetically isolate an inner chamber of the housing 1 from the outside. The shafts 10R and 10L, unlike the prior art structure discussed in the introductory part of this application, have lengths laterally extending, as described above, from the right and left side walls 40R and 40L outside the housing 1, thereby facilitating the ease with which the linear stroke of the right and left fingers 15R and 15L is increased and enabling use of a simple structure of the sealing members 14R and 14L to hermetically isolate the inner chamber of the housing 1 from the outside.

Figure 3A:
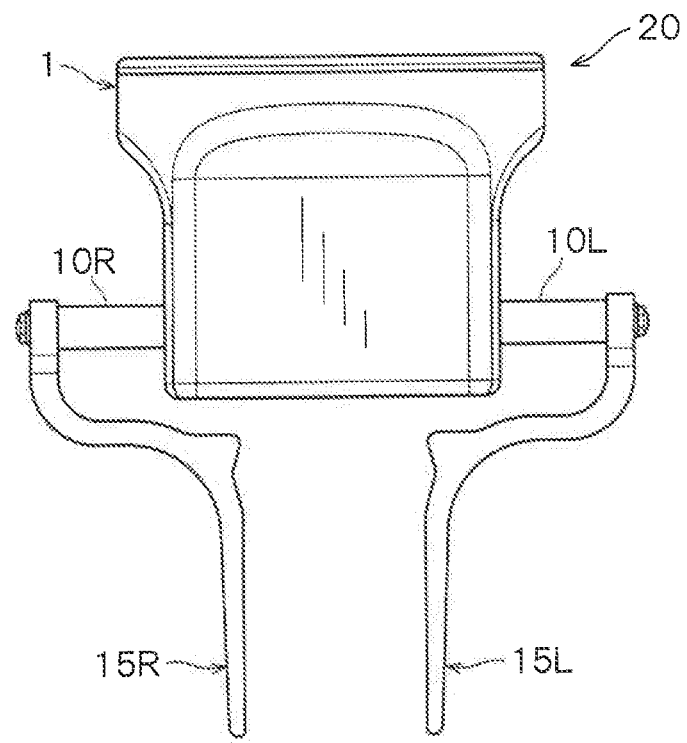
FIG. 3(*a*) is a plan view which illustrates opened fingers of the robot hand of FIG. 1.
Figure 3B:
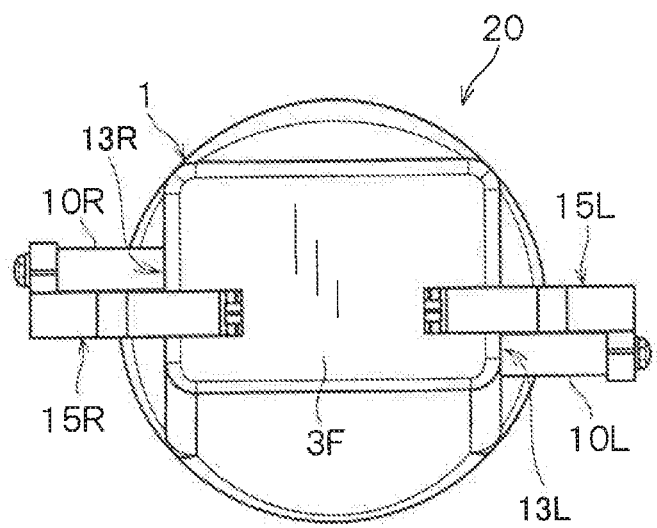
Figure 4A:
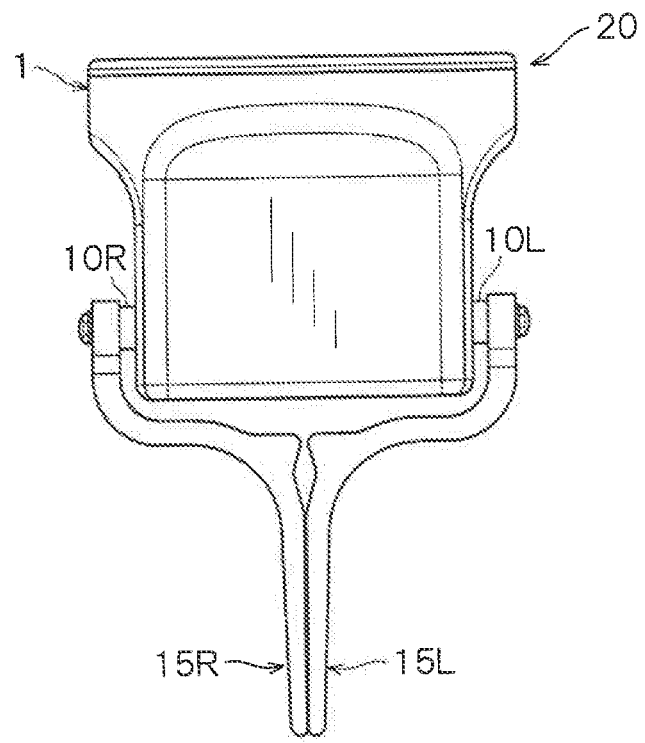
FIG. 4(*a*) a plan view which illustrates fingers of the robot hand of FIG. 1 when closed.
Figure 4B:
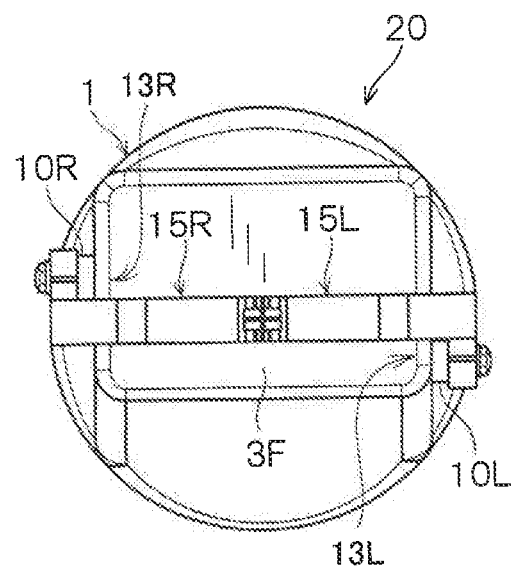
Figure 5:
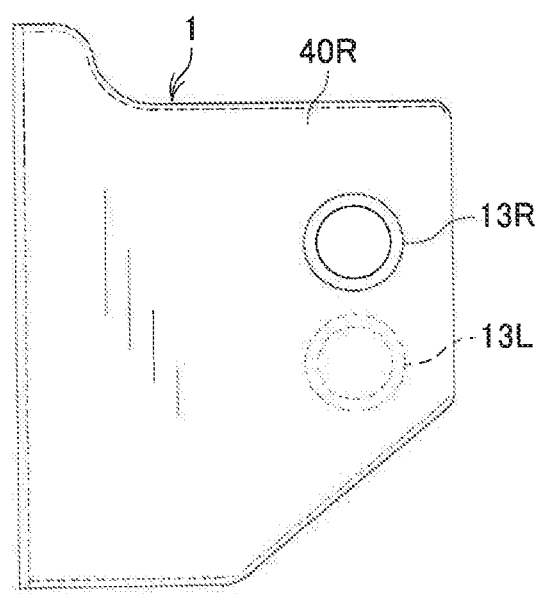
FIG. 5 is a side view which illustrates a right side wall of a housing of the robot hand in FIG. 1.

When the front of the robot hand 20 is viewed in a direction perpendicular to the drawings of FIGS. 1, 3(b), and 4(b), the guide holes 13R and 13L are located at levels different from each other because of the structure of the linear motion mechanism 7. For instance, the guide hole 13R of the right side wall 40R is, as can be seen in FIG. 5, arranged at a level higher than the guide hole 13L in the vertical direction of the robot hand 20 (i.e., a direction perpendicular to a direction in which the fingers 15R and 15L are linearly moved.

The shafts 10R and 10L have fingers 15R and 15L mounted on the front ends (i.e., outside ends) thereof, respectively. Each of the fingers 15R and 15L has a length made up of a base portion 16, an intermediate portion 17, and a tip portion 18. The base portion 16 of each of the fingers 15R and 15L is secured to a corresponding one of the shafts 10R and 10L using the bolt 19. The intermediate portions 17 of the fingers 15R and 15L are bent inwardly from the base portions 16 so that they face a longitudinal center line of the housing 1 passing through the center of the front face of the housing 1. The tip portions 18 continue from the intermediate portions 17 and extend toward the front tips of the fingers 15R and 15L, respectively. The intermediate portion 17 and the tip portion 18 of each of the fingers 15R and 15L will also be referred to below as a front portion. Each of the tip portions 18 may be designed to have at least one branched tip.

The guide holes 13R and 13L are, as described already, located at levels different from each other in the vertical direction of the robot hand 20, however, the tip portions 18 of the fingers 15R and 15L are, as can be seen in FIG. 3(b), arranged at the same level in the vertical direction. Specifically, the base portion 16 of the finger 15R is, as illustrated in FIG. 3(b), bent downward, while the base portion 16 of the finger 15L is bent upward to have the tip portions 18 located at the same level. The above described parts constitute the robot hand 20.

The operation of the robot hand 20 will be described below.

When the motor mounted in the speed reducer 6 is actuated to rotate the pinion 8 in a counterclockwise direction, the shafts 10R and 10L secured to the racks 9R and 9L are linearly moved in the left and right directions, respectively, when facing the front of the robot hand 20 as in FIG. 1. This causes the fingers 15R and 15L to be moved in the left and right directions, respectively, so that they are, as illustrated in FIGS. 2, 3(a), and 3(b), opened. Alternatively, when the motor of the speed reducer 6 is actuated to rotate the pinion 8 in a clockwise direction, the racks 9R and 9L are linearly moved in directions opposite the above directions, respectively. This causes the fingers 15R and 15L to be moved in the right and left directions. The tip portions 18 of the fingers 15R and 15L then approach and contact each other to close, as clearly illustrated in FIG. 4, the fingers 15R and 15L.

The guide holes 13R and 13L of the housing 1 are, as described above, hermetically sealed by the sealing members 14R and 14L, so that the inside of the housing 1 is kept hermetically isolated from the outside thereof while the fingers 15R and 15L are being opened or closed by the movement of the shafts 10R and 10l made by the linear actuator 4.

As apparent from the above discussion, the robot hand 20 is designed to have the tip portions 18 of the two fingers 15R and 15L which are opened or closed by the linear actuator 4. The shafts 10R and 10L which are driven by the linear actuator 4 extend from inside to outside the housing 1 through the guide holes 13R and 13L formed in the side walls of the housing 1. The based end portions 16 of the fingers 15R and 15L are joined to the shafts 10R and 10L outside the housing 1, respectively. The intermediate portions 17 are arranged closer to the tips of the fingers 15R and 15L than the base portions 16 are. The intermediate portions 17 are bent inwardly from the base portions 16 so that they extend toward the longitudinal center line of the housing 1 passing through the center of the front face of the housing 1. The tip portions 18 continuing from the intermediate portions 17 extend toward the front tips of the fingers 15R and 15L, respectively. The sealing members 14 are disposed in gaps between the circumferential surface of the guide hole 13R and the peripheral surface of the shaft 10R and between the circumferential surface of the guide hole 13L and the peripheral surface of the shaft 10L, respectively.

The shafts 10R and 10L, as described already, laterally extend from the right and left side walls 40R and 40L outside the housing 1, thereby facilitating the ease with which the lateral linear stroke of the right and left fingers 15R and 15L is increased and enabling the sealing members 14R and 14L which have a simple structure to be fit in the guide holes 13R and 13L of the right and left side walls 40R and 40L for achieving a high degree of sealing of the guide holes 13R and 13L to hermetically isolate internal parts, such as the linear actuator 4, etc., disposed in the housing 1 from outside the housing 1. This eliminates a risk that the robot hand 20 emits harmful foreign objects to working environments and also realizes the structure of the robot hand 20 in which dust is unlikely to be deposited and which is easy to clean. The use of the two fingers 15R and 15L results in the robot hand 20 having fewer movable parts, thus improving the sealing ability of the robot hand 20.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

The fingers 15R and 15L do not necessarily have the structure including of the intermediate portion 17 and the tip portion 18, but may alternatively have a front portion which extends from the base portion 16 and is designed to have a shape suitable for the size of an object to be held by the fingers 15R and 15L. For instance, the front portions of the fingers 15R and 15L may extend straight from the base portions 16 in parallel to each other or spread outwardly.

Figure 6:
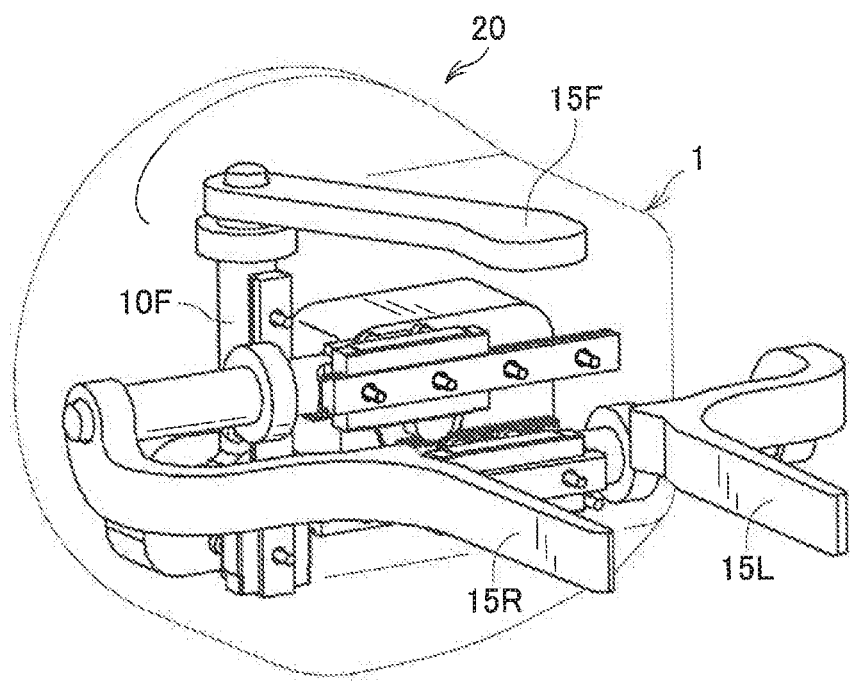
FIG. 6 is a perspective view which illustrates an internal structure of a modified form of a robot hand which equipped with three fingers.

The robot hand 20 may be designed to have three or more fingers. For instance, the robot hand 20 may be, as illustrated in FIG. 6, equipped with the third finger 15F which is moved in a vertical direction of the robot hand 20 in cooperation with movement of the right and left fingers 15R and 15L.

The third finger 15F extends from inside to outside the housing 1 through a hole formed in the front wall 3F to have a tip above the right and left fingers 15R and 15L. The hole of the front wall 3R is hermetically closed by a seal, not shown.

What is claimed is:

1. A robot hand comprising:
    a housing having a front wall, a first side wall and a second side wall, the first side wall and the second side wall are opposing walls spaced apart along the front wall that extend in a same direction from the front wall and are oblique to the front wall;
    a first guide hole which is formed in the first side wall and faces a first direction parallel to the front wall and transverse to the first side wall;
    a second guide hole which is formed in the second side wall and faces a second direction parallel to the front wall and transverse to the second side wall, the first and second directions being opposite directions;
    a first linear motion shaft which extends from inside to outside of the housing through the first guide hole in the first direction;
    a second linear motion shaft which extends from the inside to the outside the housing through the second guide hole in the second direction;
    a first finger which has a first front end portion, a first intermediate portion and a first base portion, the first intermediate portion connecting the first base portion and the first front end portion, the first base portion being secured to the first linear motion shaft outside the housing, and the first front end portion extends in front of the front wall in a third direction from the front wall;
    a second finger which has a second front end portion, a second intermediate portion, and a second base portion, the second intermediate portion connecting the second base portion and the second front end portion, the base portion being secured to the second linear motion shaft outside the housing, and the second front end portion extends in the front of the front wall in the third direction; and
    a linear actuator which is disposed in the housing, the linear actuator working to linearly move the first and second linear motion shafts along the axes of the first and second linear motion shafts to open or close the first and second front end portions in the front of the front wall such that the first and second front end portions can abut along a plane that intersects the front wall;
    wherein:
    the first front end portion and the second front end portion have first and second parallel, facing surfaces, respectively;
    the first parallel, facing surface is closer to the second parallel, facing surface than the first base portion is to the second base portion; and
    the first finger and the second finger are configured such that an object is held by the first finger and the second finger in the third direction relative to the front wall and only between the first guide hole and the second guide hole.

2. A robot hand as set forth in claim 1, wherein the first guide hole is shaped to have a center axis aligned with length of the first linear motion shaft, and the second guide hole is shaped to have a center axis aligned with length of the second linear motion shaft.

3. A robot arm as set forth in claim 1, wherein the first intermediate portion and the second intermediate portion extend towards each other from the first base portion and the second base portion.

4. A robot arm as set forth in claim 3, wherein each of the first intermediate portion and second intermediate portion includes a curved section.

5. A robot hand as set forth in claim 1, wherein the first finger and the second finger are co-planar with the linear actuator.

6. A robot hand as set forth in claim 1, wherein the first front end portion is perpendicular to the first linear motion shaft and the second front end portion is perpendicular to the second linear motion shaft.

7. A robot hand as set forth in claim 1, wherein the first intermediate portion is at an angle with the first base portion, the first front end portion is at an angle with the first intermediate portion, the second intermediate portion is at an angle with the second base portion, and the second front end portion is at an angle with the second intermediate portion.

8. A robot hand comprising:
    a housing which has a first peripheral wall and a second peripheral wall which are spaced apart and opposed to each other in a linear finger movement direction;
    a first and a second guide hole which are formed in the first and second peripheral walls of the housing, respectively;
    a first linear motion shaft which has a length extending from inside to outside the housing through the first guide hole in the linear finger movement direction;
    a second linear motion shaft which has a length extending from inside to outside the housing through the second guide hole in the linear finger movement direction;
    a first finger which has a first front portion and a first base portion, the first base portion being secured to the first linear motion shaft outside the housing, and the first front portion extending in front of the housing in a direction transverse to the linear finger movement direction;
    a second finger which has a second front portion and a second base portion, the second base portion being secured to the second linear motion shaft outside the housing, and the second front portion extending in the front of the housing in the direction transverse to the linear finger movement direction; and
    a linear actuator which is disposed in the housing, the linear actuator working to linearly move the first and second linear motion shafts in a lengthwise direction of the first and second linear motion shafts to open or close the first and second front portions in the linear finger movement direction;
    wherein:
    the first and second front portions include tips of the first and second fingers, respectively;
    the first and second front portions have parallel, facing surfaces;
    the first front portion is closer to the second front portion than the first base portion is to the second base portion; and
    the first finger and the second finger are configured such that an object is held by the first finger and the second finger in the front of the housing and only between the first guide hole and the second guide hole.

9. A robot hand as set forth in claim 8, wherein the housing also has a front wall, and wherein the first and second peripheral walls extend from the front wall away from the first and second fingers.

10. A robot hand as set forth in claim 8, wherein the first guide hole is shaped to have a center axis aligned with length of the first linear motion shaft, and the second guide hole is shaped to have a center axis aligned with length of the second linear motion shaft.

11. A robot hand comprising:
a housing;
a first guide hole which is formed in a first wall portion of the housing;
a second guide hole which is formed in a second wall portion of the housing;
a first linear motion shaft which extends from inside to outside the housing through the first guide hole;
a second linear motion shaft which extends from inside to outside the housing through the second guide hole;
a first finger which has a first front end portion, a first intermediate portion and a first base portion, the first intermediate portion connecting the first base portion and the first front end portion and the first base portion being secured to the first linear motion shaft outside the housing;
a second finger which has a second front portion, a second intermediate portion, and a second base portion, the second intermediate portion connecting the second base portion and the second front end portion and the base portion being secured to the second linear motion shaft outside the housing; and
a linear actuator which is disposed in the housing, the linear actuator working to linearly move the first and second linear motion shafts along parallel axes to open or close the first and second front portions;
wherein:
the first front end portion and the second front end portion have first and second parallel, facing surfaces, respectively;
the first parallel, facing surface is closer to the second parallel, facing surface than the first base portion is to the second base portion;
the first finger and the second finger are co-planar with the linear actuator;
the first front end portion is perpendicular to the first linear motion shaft and the second front end portion is perpendicular to the second linear motion shaft;
the first intermediate portion is at an angle with the first base portion, the first front end portion is at an angle with the first intermediate portion, the second intermediate portion is at an angle with the second base portion, and the second front end portion is at an angle with the second intermediate portion; and
the first linger and the second finger are configured such that an object is held by the first finger and the second finger in front of the housing and only between the first guide hole and the second guide hole.

* * * * *